United States Patent
Jasko et al.

(10) Patent No.: US 8,459,941 B2
(45) Date of Patent: Jun. 11, 2013

(54) MECHANICAL JOINT FOR A GAS TURBINE ENGINE

(75) Inventors: Ryan Michael Jasko, Maineville, OH (US); Kenneth Edward Seitzer, Cincinnati, OH (US); Paul Alexander Intemann, Villa Hills, KY (US); Sasikumar Muthasamy, Bangalore (IN); Jarmo Tapani Monttinen, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1031 days.

(21) Appl. No.: 12/484,468

(22) Filed: Jun. 15, 2009

(65) Prior Publication Data
US 2010/0316484 A1    Dec. 16, 2010

(51) Int. Cl.
*F01D 9/04* (2006.01)
*F01D 25/12* (2006.01)

(52) U.S. Cl.
USPC .......... 415/190; 415/142; 415/189; 415/193; 415/209.1; 415/209.2; 415/209.3; 415/209.4; 415/214.1; 415/176; 415/178; 403/337; 411/102; 285/122.1; 285/125.1; 285/129.1

(58) Field of Classification Search
USPC ........... 285/122.1, 125.1, 129.1, 368, 412; 403/335–337; 411/102; 415/175–178, 213.1, 415/214.1, 142, 189–190, 193, 209.1, 209.2, 415/209.3, 209.4
See application file for complete search history.

(56) References Cited

U.S. PATENT DOCUMENTS

| | | | | |
|---|---|---|---|---|
| 733,915 | A * | 7/1903 | Pike | 411/90 |
| 837,767 | A * | 12/1906 | Aims | 285/363 |
| 2,159,573 | A * | 5/1939 | Tinnerman | 411/112 |
| 2,258,342 | A * | 10/1941 | Tinnerman | 411/112 |
| 4,190,397 | A | 2/1980 | Gutknecht et al. | |
| 4,551,062 | A | 11/1985 | Geary | |
| 4,896,903 | A * | 1/1990 | Shumard | 285/368 |
| 5,052,891 | A * | 10/1991 | Burkholder | 416/198 A |
| 5,516,247 | A * | 5/1996 | Hosoda et al. | 411/87 |
| 5,593,277 | A | 1/1997 | Proctor et al. | |
| 5,823,741 | A | 10/1998 | Predmore et al. | |
| 6,352,404 | B1 | 3/2002 | Czachor et al. | |
| 6,467,988 | B1 | 10/2002 | Czachor et al. | |
| 6,641,326 | B2 | 11/2003 | Schilling et al. | |

(Continued)

FOREIGN PATENT DOCUMENTS

EP    1640565 A2    3/2006

OTHER PUBLICATIONS

Great Britain Search Report for corresponding GB Application No. 1009561.0, dated Sep. 6, 2010.

*Primary Examiner* — Christopher Verdier
(74) *Attorney, Agent, or Firm* — General Electric Company; David J. Clement; Jonathan M. Hines

(57) ABSTRACT

A mechanical joint for a gas turbine engine includes:(a) an annular first component having an annular, radially-extending first flange; (b) an annular second component having an annular, radially-extending second flange abutting the first flange; (c) a plurality of generally radially-extending radial channels passing through at least one of the first and second flanges; (d) a plurality of generally axially-extending channels extending through the first flange and communicating with respective ones of the radial channels; and (e) a plurality of fasteners clamping the first and second flanges together.

16 Claims, 9 Drawing Sheets

U.S. PATENT DOCUMENTS

| | | | |
|---|---|---|---|
| 6,672,833 B2 * | 1/2004 | MacLean et al. | 415/196 |
| 6,902,371 B2 | 6/2005 | Anderson et al. | |
| 2005/0204746 A1 | 9/2005 | Chereau et al. | |
| 2006/0053768 A1 | 3/2006 | Anderson et al. | |

* cited by examiner

MECHANICAL JOINT FOR A GAS TURBINE ENGINE

BACKGROUND OF THE INVENTION

This invention relates generally to gas turbine engines and more particularly to apparatus and methods for thermal management of mechanical joints in such engines.

A gas turbine engine includes a turbomachinery core with a primary gas flowpath passing serially through a high pressure compressor, a combustor, and a high pressure turbine. The core is operable in a known manner to generate a primary gas flow. In a turbojet or turbofan engine, the core exhaust gas is directed through an exhaust nozzle to generate thrust. A turboshaft engine uses a low pressure or "work" turbine downstream of the core to extract energy from the primary flow to drive a shaft or other mechanical load.

It is generally desired to seal off the primary flowpath to prevent leakage of high-pressure, high-temperature gases, so as to avoid damage to temperature-sensitive components outside the primary flowpath, for example stationary structural members, and efficiency losses, both from direct leakage and from undesirable clearance changes caused by thermal loading. One of the important seals in a gas turbine engine is the compressor discharge pressure ("CDP") seal. Typically this will be a noncontact-type seal which includes seal teeth mounted on a rotor, surrounded by a stationary abradable member.

Thermal growth response of the CDP seal is directly related to engine performance and fuel efficiency. There is a need is to slow the natural thermal response of the stationary CDP seal member in order to match it with the relatively slow response of the rotor. A slow-responding CDP seal will rub less and maintain a tighter seal, which improves performance.

Seal response has been addressed in the past with the use of low thermal growth alloys and heat shields. However, low thermal growth alloys typically have strength limitations at high temperatures. Heat shields typically are made of sheet metal and cover the expanse of the outer diameter of the CDP seal.

Furthermore, the hardware around the CDP seal often includes a joint having a number of flanges which are bolted together. Such joints can have a short low cycle fatigue ("LCF") life caused by large radial thermal gradients between the center and the radial edges of the flanges. The LCF life can be improved by using a single integrated flange, but such a design is not always feasible because of space limitations.

BRIEF SUMMARY OF THE INVENTION

These and other shortcomings of the prior art are addressed by the present invention, which provides a multi-flange bolted joint which has controlled thermal response and uniform thermal stresses.

According to one aspect of the invention, a mechanical joint for a gas turbine engine includes:(a) an annular first component having an annular, radially-extending first flange; (b) an annular second component having an annular, radially-extending second flange abutting the first flange; (c) a plurality of generally radially-extending radial channels passing through at least one of the first and second flanges; (d) a plurality of generally axially-extending channels extending through the first flange and communicating with respective ones of the radial channels; and (e) a plurality of fasteners clamping the first and second flanges together.

According to another aspect of the invention, a joint structure for a gas turbine engine includes: (a) an annular nozzle support coupled to a stationary turbine nozzle, including a radially-extending nozzle support flange, the nozzle support flange having a plurality of generally radially-extending first grooves formed therein; (b) an annular diffuser including a plurality of streamlined struts and a diffuser arm carrying a radially-extending diffuser flange abutting the nozzle support flange, the diffuser flange including a plurality of generally radially-extending second grooves formed therein, wherein the first and second grooves are circumferentially aligned so as to cooperatively define radial channels; (c) an annular outlet guide vane structure including a plurality of airfoil-shaped vanes and an outlet guide vane arm carrying a radially-extending outlet guide vane flange which abuts the diffuser flange, wherein the diffuser arm and the outlet guide vane arm cooperatively define an open volume therebetween; (d) a plurality of generally axially-extending channels extending through the diffuser and outlet guide flanges, and communicating with respective ones of the radial channels and the open volume; and (e) a plurality of fasteners clamping the nozzle support flange, diffuser flange, and outlet guide vane flange together.

According to another aspect of the invention, a method is provided for reducing thermal gradients in a mechanical joint for a gas turbine engine of the type including two or more annular components each having radially-extending flanges which are clamped together with a plurality of fasteners, wherein exterior surfaces of the annular components are exposed in operation to high-temperature gases. The method includes passing high-temperature gases from the exterior through central portions of the clamped flanges.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
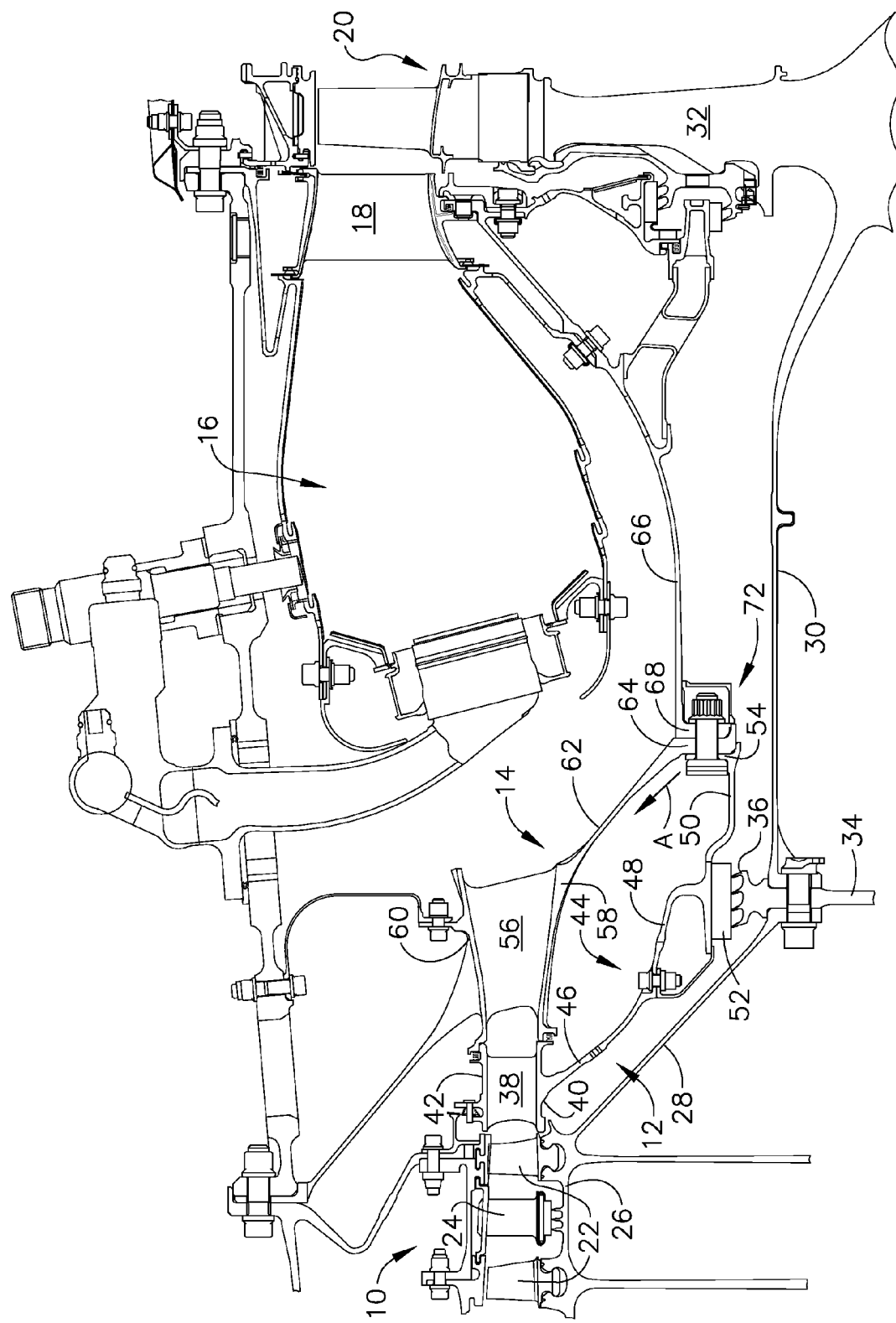
FIG. 1 is a cross-sectional view of a portion of a gas turbine engine constructed in accordance with an aspect of the present invention.

Referring to the drawings wherein identical reference numerals denote the same elements throughout the various views, FIG. 1 depicts a portion of a gas turbine engine including, generally, a high pressure compressor 10, an outlet guide vane (OGV) structure 12, a diffuser 14, a combustor 16, a turbine nozzle 18, and a high pressure turbine rotor 20. In the illustrated example, the engine is a high-bypass turbofan engine. However, the principles described herein are equally applicable to turboprop, turbojet, and turbofan engines, as well as turbine engines used for other vehicles or in stationary applications.

The compressor 10 includes a plurality of alternating stages of rotating blades 22 and stationary nozzles 24. Only the final stages of the compressor 10 are shown. The blades 22 are carried on a spool 26 which includes a shaft arm 28 that extends axially aft and radially inward. This is coupled to a turbine shaft 30 which is part of a turbine rotor disk 32. A seal disk 34 is clamped in the joint between the shaft arm 28 and the turbine shaft, and carries a plurality of annular seal teeth 36.

The OGV structure 12 includes an array of airfoil-shaped vanes 38 located just downstream of the compressor 10. The vanes 38 are disposed between annular inner and outer platforms 40 and 42. An annular arm 44 includes a forward portion 46 extending generally axially aft and radially inward from the inner platform 40, a center portion 48 which is generally cylindrical, and an aft portion 50 which extends axially aft from the center portion 48.

A stationary annular seal member, referred to as a CDP seal 52, is carried on the inboard surface of the center portion 48. The CDP seal 52 is made from a compliant material of a known type, for example an abradable compound, a honeycomb or other cellular structure, or a metallic brush seal. The CDP seal 52 surrounds the seal teeth 36 leaving a small radial gap. An annular OGV flange 54 extends radially outward at the aft end of the aft portion 50.

The diffuser 14 includes an array of streamlined struts 56 located just downstream of the OGV vanes 38. The struts 56 are disposed between annular inner and outer platforms 58 and 60. An annular arm 62 extends generally axially aft and radially inward from the inner platform 58. An annular diffuser flange 64 extends axially inward at the aft end of the arm 62.

An annular inner nozzle support 66 extends axially forward from the turbine nozzle 18. An annular nozzle support flange 68 extends axially inward at the forward end of the inner nozzle support 66. Optionally, the nozzle support flange 68 may have an array of scallops 70 or other negative features formed therein (best seen in FIG. 2). These reduce the mass and thus the thermal inertia of the nozzle support flange 68. This in turn increase the thermal response of the inner nozzle support 66 and reduces thermal gradients therein during operation.

The OGV flange 54, diffuser flange 64, and the nozzle support flange 68 are clamped together at a joint 72 and secured by a plurality of fasteners such as the illustrated bolts 74, which pass through aligned bolt holes in the joined components. This joint 72 is shown in detail in FIG. 2. The joint 72 is provided with means for bleeding compressor discharge air to the volume between the CDP seal 52 and the diffuser 14 while minimizing temperature gradients within the coupled flanges. In the illustrated example this is done by providing a bleed flowpath which passes through the center of the joint 72. The nozzle support flange 68 has an array of generally radially-oriented grooves 76 formed in its forward face. These are aligned with corresponding grooves 78 formed in an aft face of the diffuser flange 64 to cooperatively define radial channels 80. Depending on the particular application, it may be possible to form a single radial channel through one of the flanges.

Figure 2:
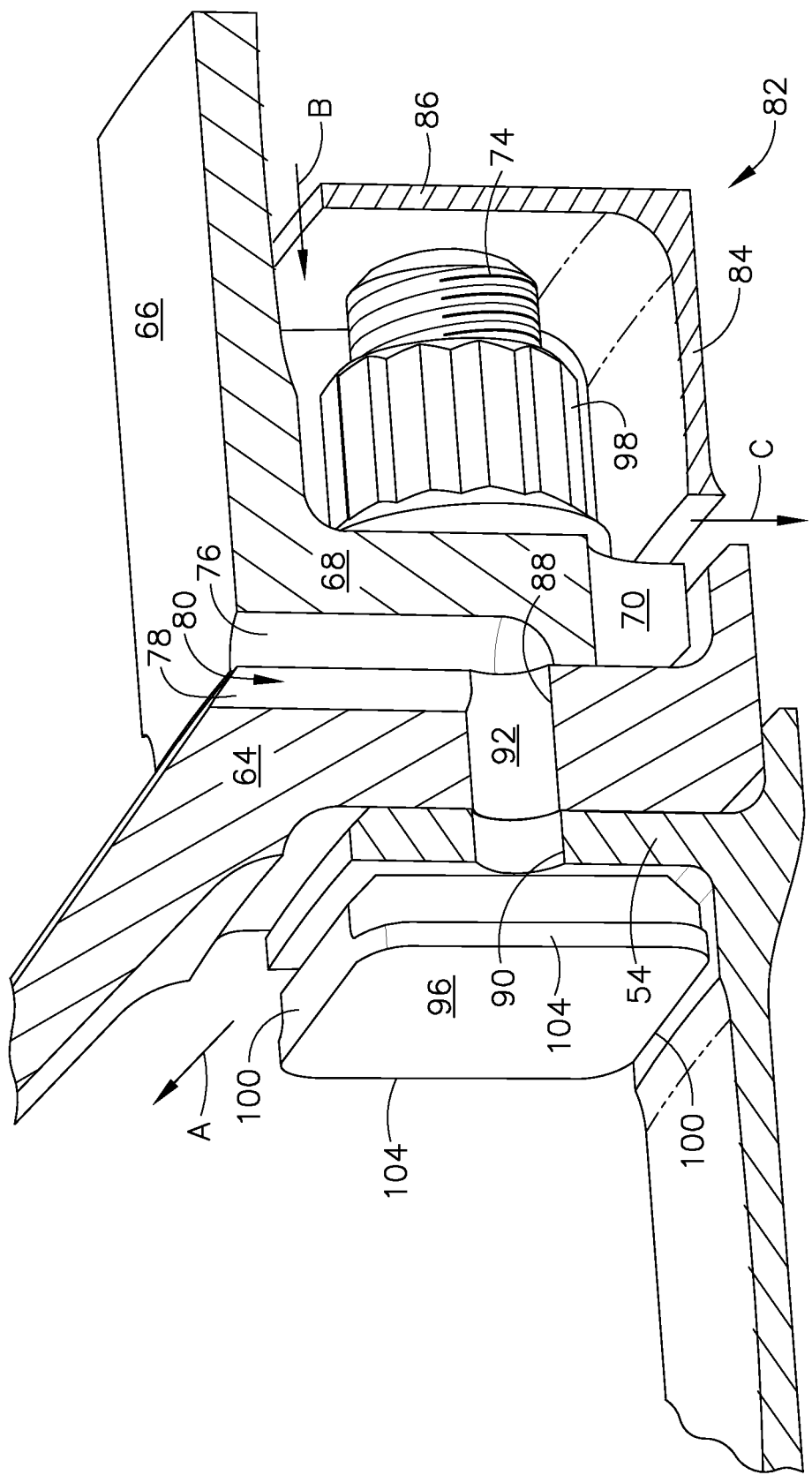
FIG. 2 is a perspective sectional view of a bolted diffuser-to-stator joint constructed in accordance with the present invention.
Figure 3:
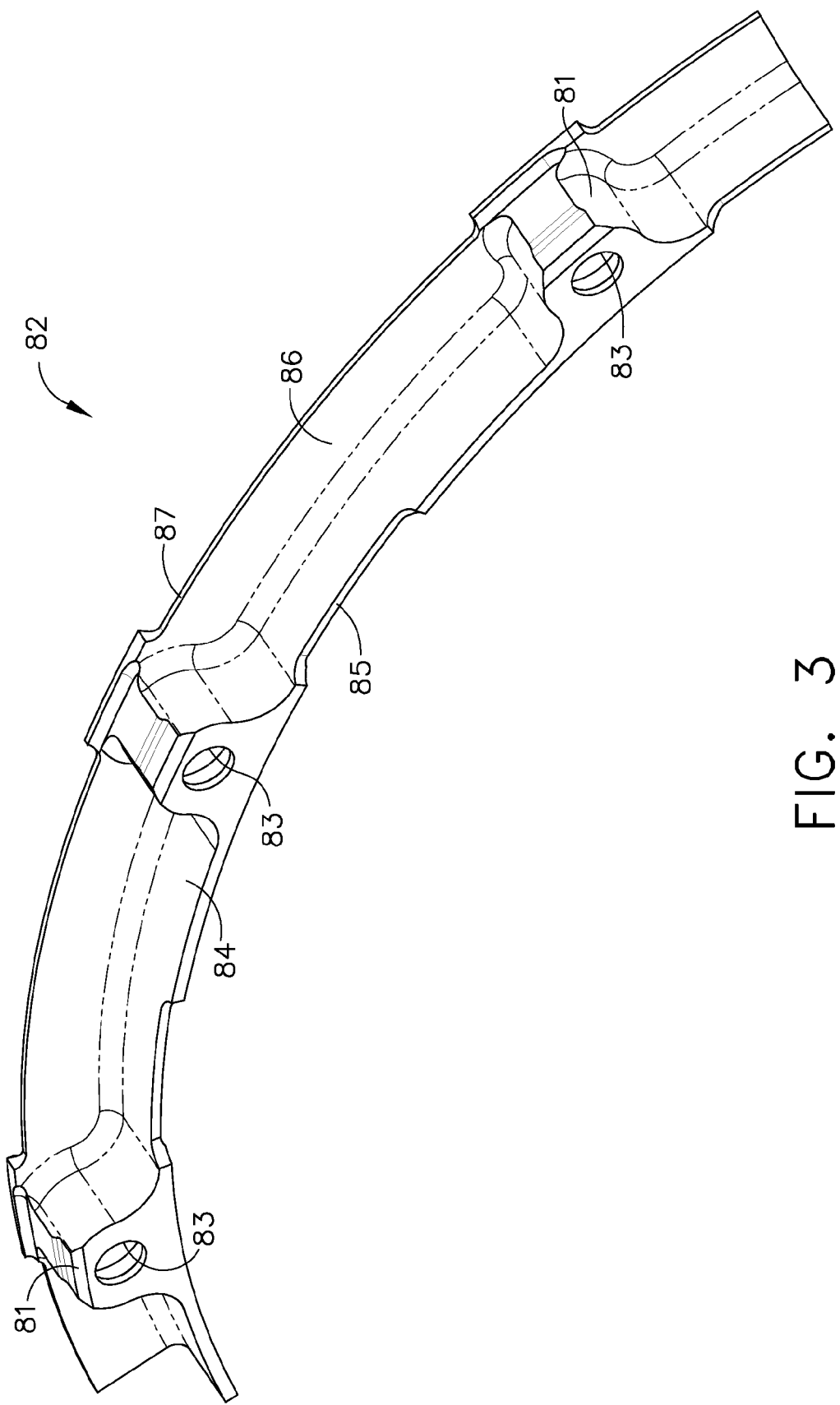
FIG. 3 is a perspective view of a portion of a bolt shield for use with the joint shown in FIG. 2.

The exposed ends of the bolts 74 are surrounded with an annular windage shield 82, which is shown in more detail in FIG. 3. It is an arcuate member (it may be continuous or segmented) having a generally "L"-shaped cross section with an axially-extending leg 84 and a radially-extending leg 86. A number of pockets 81 with bolt holes 83 are positioned around the circumference of the windage shield 82. The axially-extending leg 84 has a slot 85 formed in its forward edge adjacent each of the pockets 81 and extending a portion of the distance between two pockets 81. The radially-extending leg 86 has a slot 87 formed in its radially outer edge between each of the pockets 81, which extends substantially the whole distance between adjacent pockets 81. When installed, as seen in FIG. 2, a small radial gap is present between the outer end of the radially-extending leg 86 and the radially inner surface of the inner nozzle support 66, and a small axial gap is present between the forward end of the axially-extending leg 84 and the nozzle support flange 68.

Referring back to FIG. 2, a plurality of generally axially-extending holes 88 are formed through the diffuser flange 64 and intersect the radial channels 80. A plurality of apertures 90 are also formed through the OGV flange 54, and are aligned with the holes 88. Together, the holes 88 and the apertures 90 define axial channels 92. The axial and radial channels 92 and 80 define the complete flowpath through the joint 72.

Optionally, the joint 72 may include some means for flow deflection, i.e. blocking flow from the apertures 90 from passing directly forward and impinging on the CDP seal 52. In the illustrated example, this is accomplished by incorporating a shielding structure in the bolts 74. Each of the bolts 74 has a shank and an enlarged head 96. The end of the shank opposite the head 96 is threaded in a known manner. The head 96 generally includes at least one anti-rotation feature that interfaces with the OGV arm 44 to prevent rotation when a nut 98 is installed on the bolt 74. In the illustrated example the head 96 includes an opposed pair of flat side faces 100 for this purpose. The shielding structure comprises one or more laterally-extending features which block flow through the apertures 90. In this example the head 96 is generally a rectangular solid, and the portions of the head 96 intermediate the flat side faces 100 incorporates one or more laterally-extending tabs 104.

Figure 4:
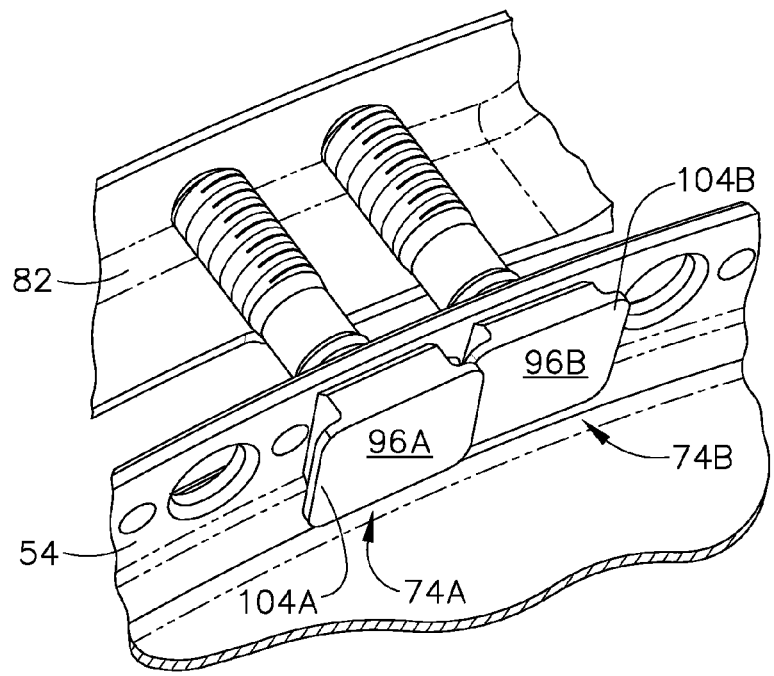
FIG. 4 is an exploded perspective view of a portion of the joint shown in FIG. 2.
Figure 5:
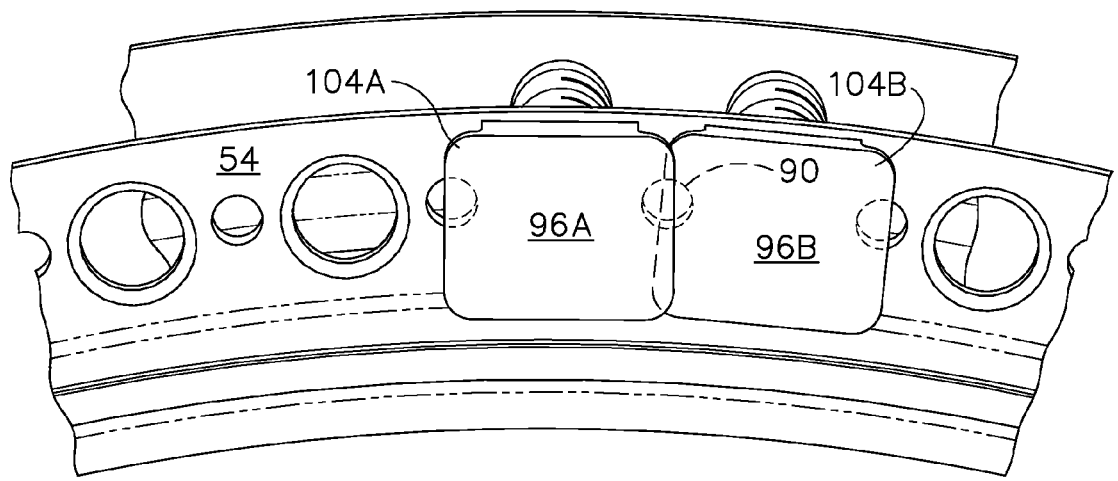
FIG. 5 is a front elevational view of the joint shown in FIG. 4.

The bolts 74 may be sized such that the tabs 104 of adjacent bolts 74 define a small gap therebetween. Alternatively, depending on the specific application, the shielding structures of adjacent bolts 74 may be configured to overlap each other. For example, in FIGS. 4 and 5, bolts 74A and 74B employ the tabbed configuration described above. The heads 96A of alternate ones of the bolts 74A are slightly thicker than the heads 96B of the adjacent bolts 74B. As a result, when installed, the tabs 104A of bolts 74A are positioned axially forward of the tabs 104B of bolts 74B. This permits the tabs 104A and 104B to overlap in a lateral direction, blocking flow from the apertures 90 from passing axially forward, as seen most clearly in FIG. 5.

In operation, both the inboard and outboard surfaces of the joint 72 are exposed to CDP air at high temperature, for example about 700° C. (1300° F.). CDP air also enters the radial channels 80, passes through them into the axial channels 92, and out into the space between the OGV structure 12 and the diffuser 14. As the air passes through the channels 80 and 92, it heats the inner portions of the OGV flange 54, diffuser flange 64, and the nozzle support flange 68, minimizing any temperature gradients through the radial thickness of those components. The air exits the apertures 90 at a location substantially aft of the CDP seal 52, avoiding direct impingement and thus reducing the thermal response of the CDP seal 52. Impingement on the CDP seal 52 is further avoided because the air exiting the apertures 90 is deflected in a radially outboard direction by the bolt heads 96, as depicted by the arrow labeled "A" in FIG. 1.

Reduction of thermal gradients in the joint 72 is also improved by selective configuration of the windage shield 82. Ordinarily in prior art usage a fastener windage shield would cover the underlying bolts 74 as completely as possible to minimize frictional heating of the air flow. However, the incorporation of the slots 85 and 87 permits some heated air flow to circulate through the interior of the windage shield 82 in axial and tangential directions, and to contact the nozzle support flange 68, before exiting the windage shield 82, as shown by the arrows "B" and "C" in FIG. 2. As noted above, the nozzle support flange 68 may have an array of scallops 70 or other negative features formed therein, which reduce its thermal inertia and improve its response to the flow through the radial gap.

Figure 6:
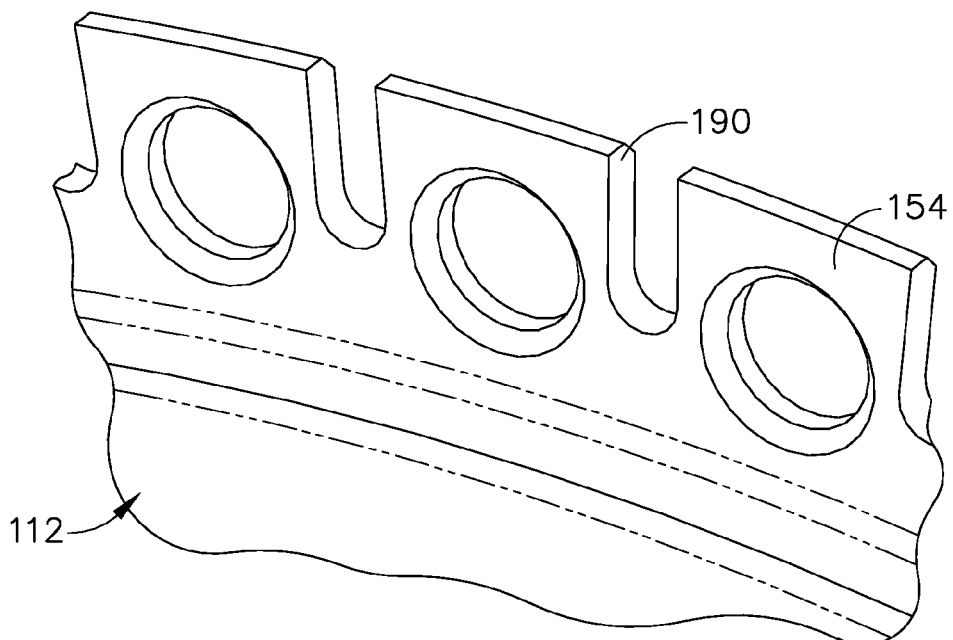
FIG. 6 is a perspective view of an alternative OGV flange.
Figure 7:
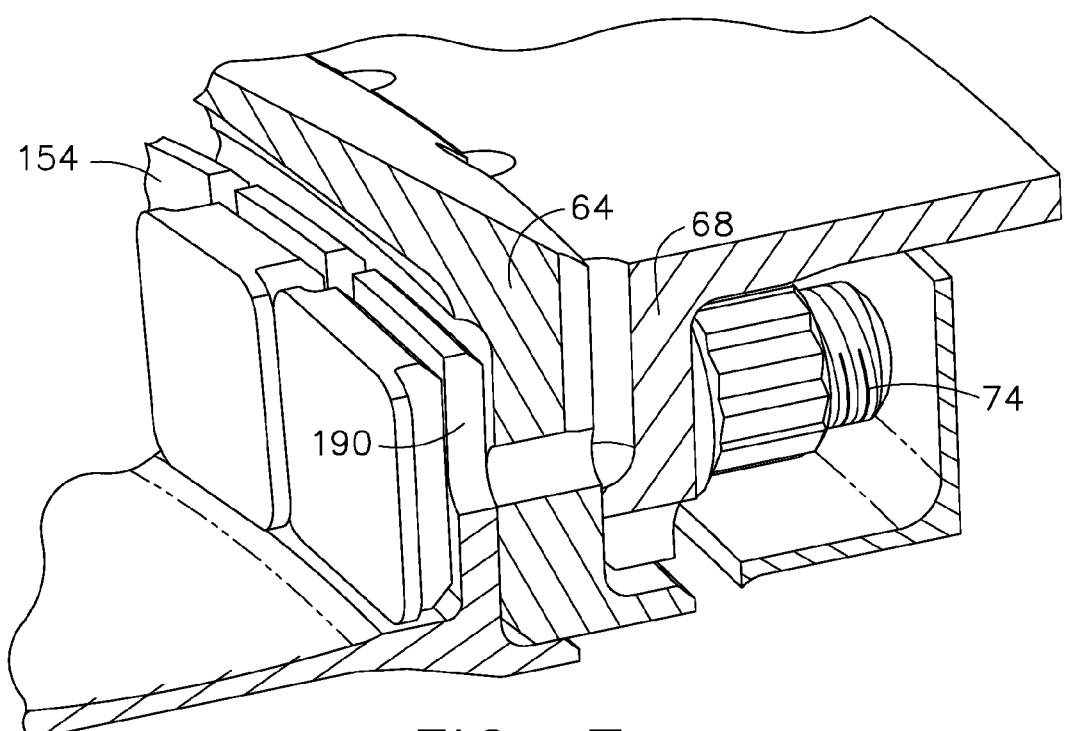
FIG. 7 is a perspective sectional view of a bolted diffuser-to-stator joint incorporating the alternative OGV flange shown in FIG. 6.

Depending on the specific application, it may be necessary or desirable to increase the exit flow area from the OGV flange 54. As an example of how this may be accomplished, FIG. 6 shows a portion of an OGV structure 112 having an OGV flange 154 similar in construction to the OGV flange 54 described above. The OGV flange 154 incorporates generally radially-aligned slots 190 which extend to an outboard edge of the OGV flange 154. FIG. 7 shows the OGV flange 154 clamped to a diffuser flange 64 and a nozzle support flange 68 with bolts 74. The inboard ends of the slots 190 communicate with the holes 88 in the diffuser flange 68. The slots 190 provide additional flow area past the heads 96 of the bolts 74, as compared to the configuration shown in FIG. 2.

Figure 8:
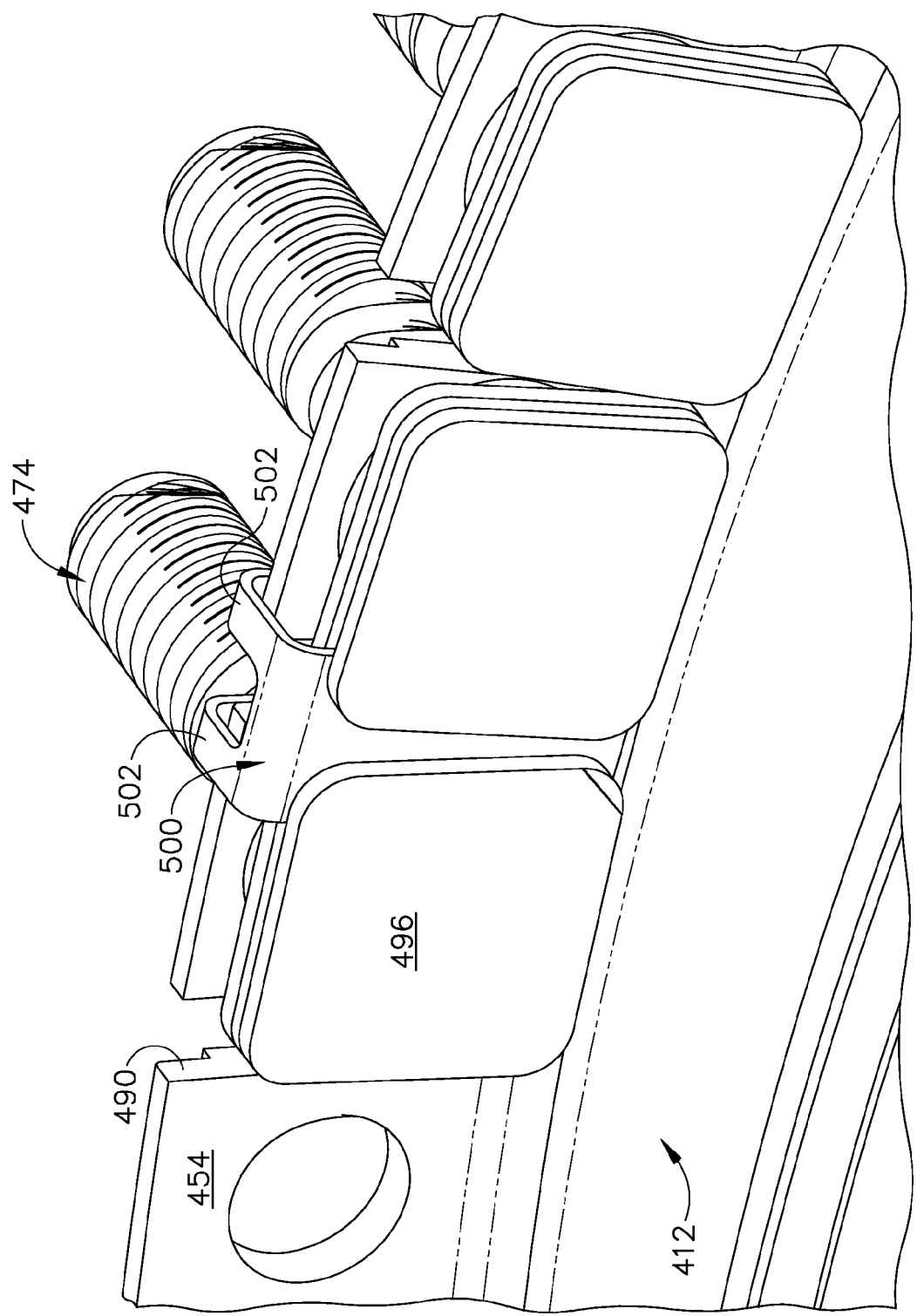
FIG. 8 is a front perspective view of a joint incorporating an alternative flow directing feature.
Figure 9:
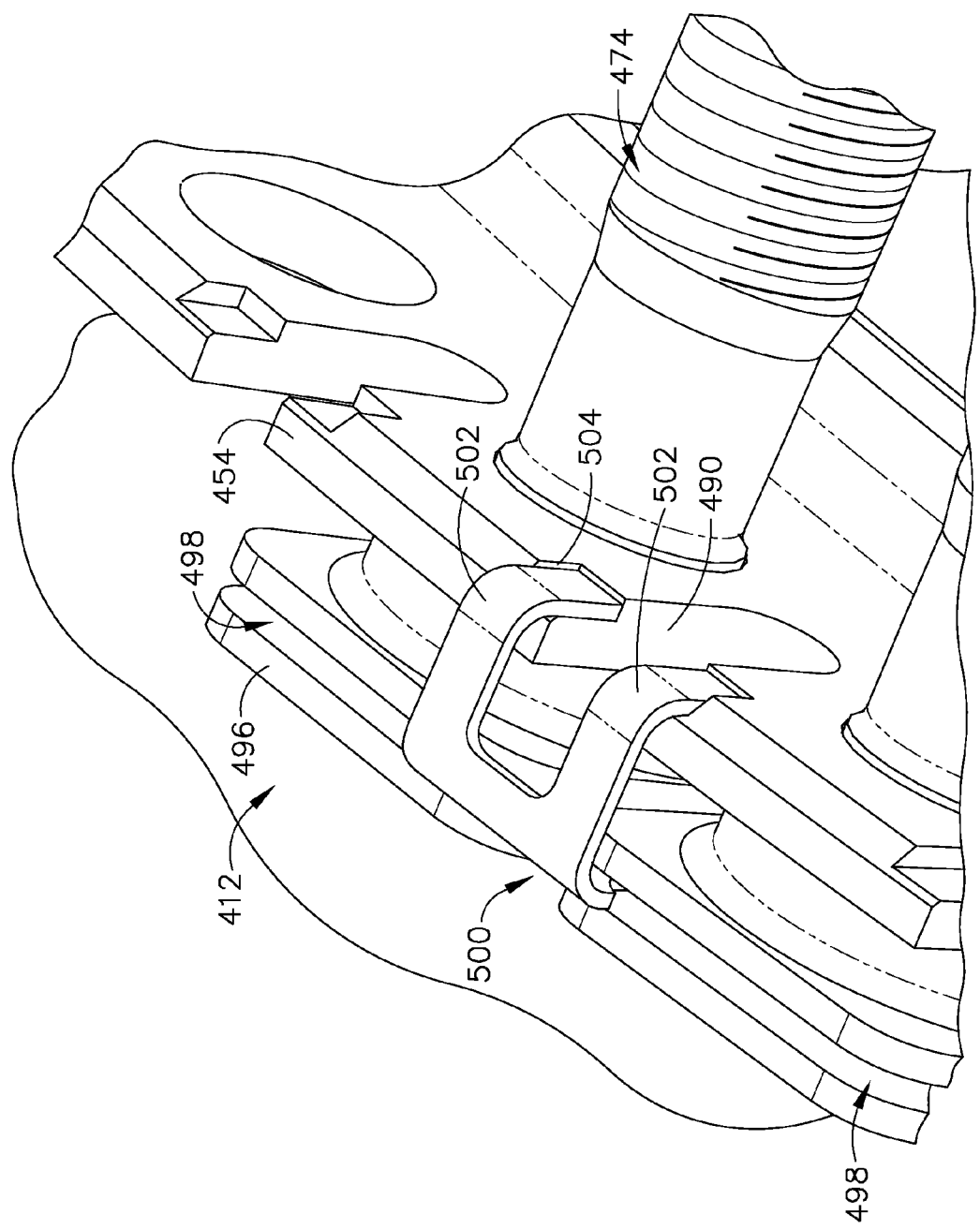
FIG. 9 is an aft perspective view of the joint of FIG. 8.

FIGS. 8 and 9 depict an alternative configuration for flow deflection within the joint. This configuration utilizes an OGV structure 412 which is generally similar to the OGV structure 112 described above. It includes an OGV flange 454 having a plurality of generally radially-aligned slots 490. Bolts 474, similar to bolts 74, are received in bolt holes in the OGV flange 454. Each of the bolts 474 has a threaded shank and an enlarged head 496, and in this example the head 496 is generally a rectangular solid. The lateral surfaces of the head 496 have a peripheral groove 498 formed therein. When the joint is assembled, a clip 500 is disposed between each of the bolt heads 496 and is received in the grooves 498. Only one clip is shown in FIGS. 8 and 9.

The clip 500 is formed from flat stock, for example sheet metal, and is generally "J"-shaped, with a pair of fingers 502 located at its outer end. The fingers 502 engage recesses 504 formed in the OGV flange 454 at the edges of the slots 490. When installed, the clips 504 form a barrier to prevent air flow in the axially forward direction, but allow air flow radially outward through the space between the fingers 502.

Figure 10:
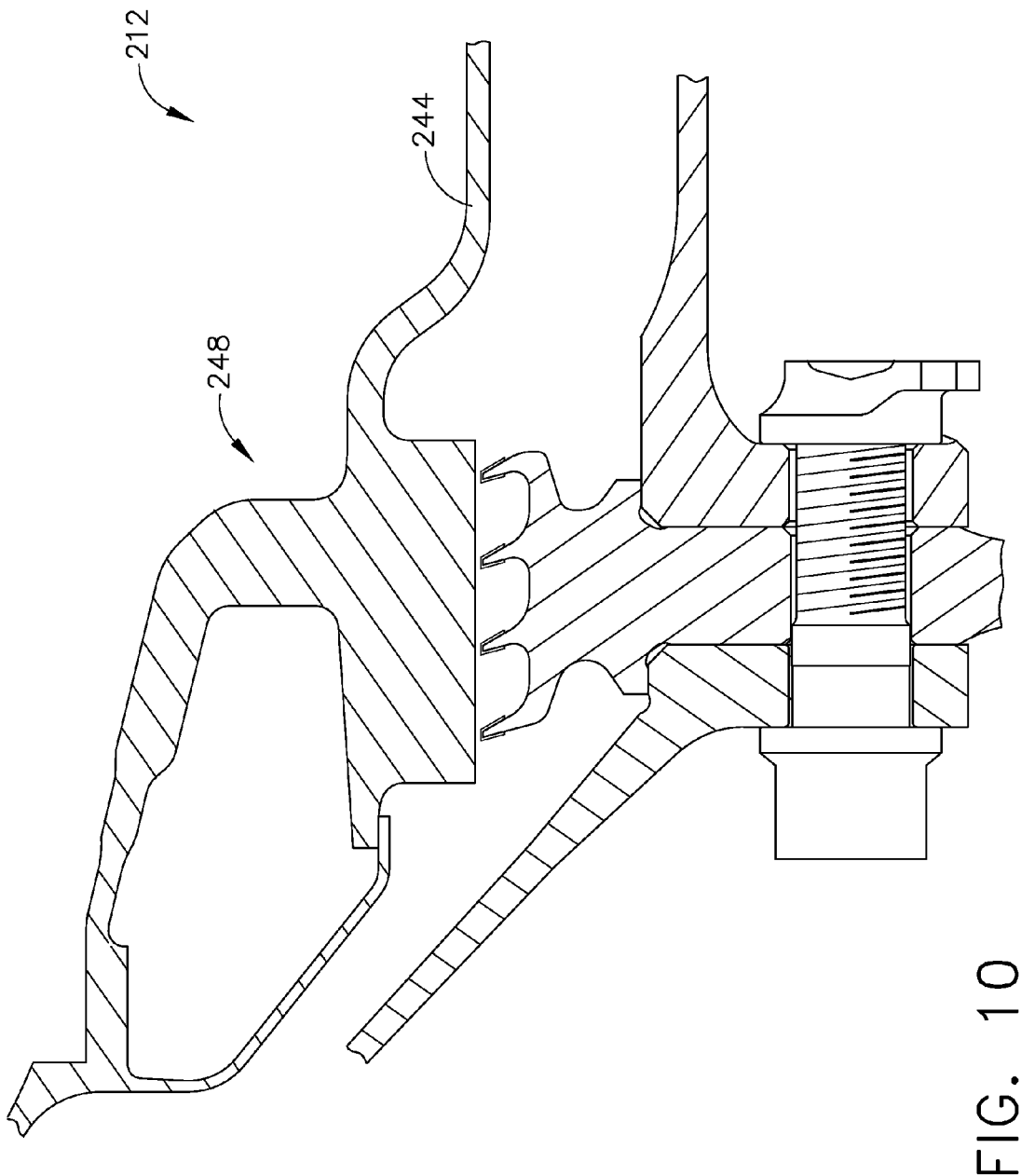
FIG. 10 is a cross-sectional view of alternative OGV structure.

In addition to, or as an alternative to the flow deflection features described above, response of the CDP seal 52 can be controlled by addition of mass so as to increase its thermal inertia. For example, FIG. 10 illustrates an alternative OGV structure 212 in which the material thickness in the center portion 248 of the arm 244 is substantially increased. For example, the material thickness may be at least about twice the thickness as that of the OGV structure 12 depicted in FIG. 1.

Figure 11:
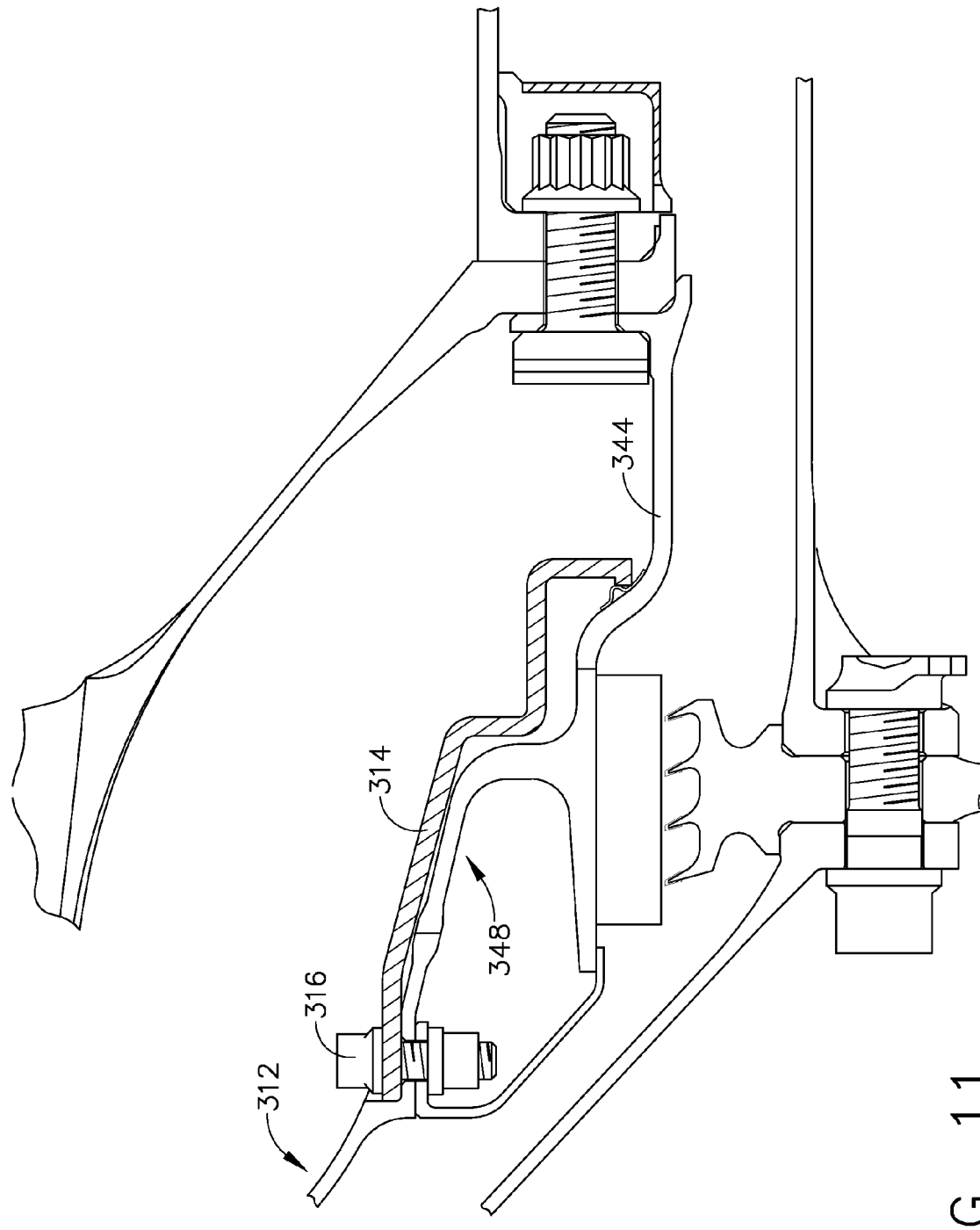
FIG. 11 is a cross-sectional view of another alternative OGV structure incorporating a heat shield.

FIG. 11 illustrates another alternative OGV structure 312 incorporating an annular heat shield 314 which surrounds a center portion 348 of an arm 344. The heat shield 314 may be constructed of sheet metal or a similar material and closely conforms to the various bends in the arm 344. The heat shield 314 may be secured with a plurality of fasteners such as the illustrated bolts 316. As is the case with the increased mass arm 244, the heat shield 314 may be used in addition to or as an alternative to the flow deflection features described above.

The joint configuration described above has several benefits over prior art designs. This configuration allows the use of cast material instead of forged for the inner nozzle support 66. Furthermore the design will improve specific fuel consumption (SFC) due to reduced CDP seal clearance. Additional benefits may be gained due to the more circumferentially uniform flow as the space between the OGV structure 12 and the diffuser 14 is fed by a large number of holes (for example, 68 holes) instead of the small number of holes used in prior art designs. Another advantage is the dual-purposing of the bolts 74 to deflect impingement on the CDP seal 51, potentially eliminating the need for additional hardware to slow seal response, such as a heat shield.

The foregoing has described a bolted joint arrangement for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A mechanical joint for a gas turbine engine, comprising:
    (a) an annular first component having an annular, radially-extending first flange;
    (b) an annular second component having an annular, radially-extending second flange abutting the first flange;
    (c) a plurality of generally radially-extending radial channels passing through at least one of the first and second flanges;
    (d) a plurality of generally axially-extending channels extending through the first flange and communicating with respective ones of the radial channels; and
    (e) a plurality of fasteners clamping the first and second flanges together, wherein a head of each of the fasteners includes one or more tabs which extend laterally so as to deflect flow through passing through the axial channels.

2. The mechanical joint of claim 1, wherein:
    (a) the first flange has a plurality of generally radially-extending first grooves formed therein; and
    (b) the second flange has a plurality of generally radially-extending second grooves formed therein, wherein the first and second grooves are circumferentially aligned so as to cooperatively define the radial channels.

3. The mechanical joint of claim 1 wherein the tabs carried by adjacent fasteners are axially offset and overlap each other in a lateral direction.

4. A joint structure for a gas turbine engine, comprising:
    (a) an annular nozzle support coupled to a stationary turbine, including a radially-extending nozzle support flange, the nozzle support flange having a plurality of generally radially-extending first grooves formed therein;
    (b) an annular diffuser including a plurality of streamlined struts and a diffuser arm carrying a radially-extending diffuser flange abutting the nozzle support flange, the diffuser flange including a plurality of generally radially-extending second grooves formed therein, wherein the first and second grooves are circumferentially aligned so as to cooperatively define radial channels;
    (c) an annular outlet guide vane structure including a plurality of airfoil-shaped vanes and an outlet guide vane arm carrying a radially-extending outlet guide vane flange which abuts the diffuser flange, wherein the diffuser arm and the outlet guide vane arm cooperatively define an open volume therebetween;
(d) a plurality of generally axially-extending channels extending through the diffuser and outlet guide flanges, and communicating with respective ones of the radial channels and the open volume;
(e) a plurality of fasteners clamping the nozzle support flange, diffuser flange, and outlet guide vane flange together, wherein each of the fasteners has a head disposed adjacent the outlet guide vane flange, each head including one or more tabs which extend laterally so as to deflect flow through passing through the axial channels.

5. The joint structure of claim 4 wherein the tabs carried by adjacent fasteners are axially offset and overlap each other in a lateral direction.

6. The joint structure of claim 4 wherein the nozzle support flange includes a plurality of scallops formed therein.

7. The joint structure of claim 4 wherein the outlet guide vane flange includes a plurality of generally radially-extending slots which communicate with the axial channels and a radially outer edge of the outlet guide vane flange.

8. The joint structure of claim 4 wherein a center portion of the outlet guide vane arm carries a stationary seal member on an inner surface thereof.

9. The joint structure of claim 8 wherein the center portion of the outlet guide vane arm carrying the stationary seal member is at least twice as thick as a remaining portion of the outlet guide vane arm.

10. The joint structure of claim 8 further comprising an annular heat shield surrounding the center portion of the outlet guide vane arm.

11. The joint structure of claim 8 further comprising an annular windage shield having an L-shaped cross-section disposed adjacent the nozzle support and surrounding the fasteners.

12. The joint structure of claim 11 wherein preselected gaps are present between distal ends of axial and radial legs of the windage shield and the adjacent nozzle support, so as to allow flow circulation past the fasteners.

13. A mechanical joint for a gas turbine engine, comprising:
(a) an annular first component having an annular, radially-extending first flange;
(b) an annular second component having an annular, radially-extending second flange abutting the first flange;
(c) a plurality of generally radially-extending radial channels passing through at least one of the first and second flanges;
(d) a plurality of generally axially-extending channels extending through the first flange and communicating with respective ones of the radial channels;
(e) a plurality of fasteners clamping the first and second flanges together; and
(f) a plurality of clips disposed between the fasteners so as to deflect flow through passing through the axial channels, the clips being retained in grooves formed in heads of the fasteners.

14. The mechanical joint of claim 13 wherein the clips are generally J-shaped and include spaced-apart fingers which engage one of the flanges.

15. A joint structure for a gas turbine engine, comprising:
(a) an annular nozzle support coupled to a stationary turbine, including a radially-extending nozzle support flange, the nozzle support flange having a plurality of generally radially-extending first grooves formed therein;
(b) an annular diffuser including a plurality of streamlined struts and a diffuser arm carrying a radially-extending diffuser flange abutting the nozzle support flange, the diffuser flange including a plurality of generally radially-extending second grooves formed therein, wherein the first and second grooves are circumferentially aligned so as to cooperatively define radial channels;
(c) an annular outlet guide vane structure including a plurality of airfoil-shaped vanes and an outlet guide vane arm carrying a radially-extending outlet guide vane flange which abuts the diffuser flange, wherein the diffuser arm and the outlet guide vane arm cooperatively define an open volume therebetween;
(d) a plurality of generally axially-extending channels extending through the diffuser and outlet guide flanges, and communicating with respective ones of the radial channels and the open volume;
(e) a plurality of fasteners clamping the nozzle support flange, diffuser flange, and outlet guide vane flange together; and
(f) a plurality of clips disposed between the fasteners so as to deflect flow passing through the axial channels, the clips being retained in grooves formed in heads of the fasteners.

16. The joint structure of claim 15 wherein the clips are generally J-shaped and include spaced-apart fingers which engage the outlet guide vane flange.

* * * * *